US011066935B1

(12) United States Patent
Stein et al.

(10) Patent No.: US 11,066,935 B1
(45) Date of Patent: Jul. 20, 2021

(54) ROTOR BLADE AIRFOIL

(71) Applicant: General Electric Company, Schenectady, NY (US)

(72) Inventors: Alexander Stein, Simpsonville, SC (US); Mark Steven Honkomp, Taylors, SC (US); Mehmet Suleyman Ciray, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/824,959

(22) Filed: Mar. 20, 2020

(51) Int. Cl.
*F01D 5/14* (2006.01)

(52) U.S. Cl.
CPC ........ *F01D 5/141* (2013.01); *F05D 2240/301* (2013.01); *F05D 2240/303* (2013.01); *F05D 2240/304* (2013.01); *F05D 2240/305* (2013.01); *F05D 2240/306* (2013.01); *F05D 2240/80* (2013.01)

(58) Field of Classification Search
CPC ............... F01D 5/141; F05D 2240/305; F05D 2240/80; F05D 2240/304; F05D 2240/303; F05D 2240/301; F05D 2240/306
See application file for complete search history.

(56) References Cited

U.S. PATENT DOCUMENTS 7,217,101 B2 5/2007 Harvey
9,593,584 B2 3/2017 Lehmann et al.
2014/0119920 A1 5/2014 Coull et al.
2015/0110617 A1* 4/2015 Stein ....................... F01D 5/141 415/208.1

* cited by examiner

*Primary Examiner* — Jacob M Amick
*Assistant Examiner* — Charles J Brauch
(74) *Attorney, Agent, or Firm* — Dority & Manning, P.A.

(57) ABSTRACT

Rotor blades and turbomachines are provided. A rotor blade includes a platform and an airfoil extending radially from a root proximate the platform to a tip. The airfoil includes a leading edge and a trailing edge. The airfoil further includes a pressure side surface extending between the leading edge and the trailing edge. The airfoil also includes a suction side surface disposed opposite the pressure side surface and extending between the leading edge and the trailing edge. The leading edge, the trailing edge, the pressure side surface, and the suction side surface collectively define a first profile at the tip and a second profile radially inward from the tip. The first profile includes a suction side overhang, a pressure side overhang, and a pressure side underhang relative to the second profile.

18 Claims, 5 Drawing Sheets

ROTOR BLADE AIRFOIL

FIELD

The present disclosure relates generally to turbomachines. Specifically, the present disclosure relates to improved rotor blade airfoils.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Many turbomachines include one or more stages of rotor blades within both the compressor section and the turbine section, which during operation are exposed to fluid flows. Each rotor blade may include a base that supports a respective airfoil, which is configured to aerodynamically interact with and/or extract work from fluid flow. As a result of this interaction and conversion, the aerodynamic characteristics of these airfoils may result in losses that have an impact on system and turbomachine operation, performance, thrust, efficiency, and power at each stage.

A source of aerodynamic loss and inefficiency for rotor blades, particularly in gas turbines, is over-tip leakage. During operation, portions of the fluid flow may leak over a tip of the airfoil and form a vortex on a suction side of the airfoil. This leakage and subsequent vortex formation on the suction side may cause a pressure gradient to form across the tip and/or through the blade clearance gap, thereby impacting the fluid flow and efficiency of the system and airfoil and hindering device performance. Accordingly, improved rotor blades are needed. In particular, a rotor blade having an airfoil that minimizes over-tip leakage would be advantageous.

BRIEF DESCRIPTION

Aspects and advantages of the rotor blades and turbomachines in accordance with the present disclosure will be set forth in part in the following description, or may be obvious from the description, or may be learned through practice of the technology.

In accordance with one embodiment, a rotor blade for a turbomachine is provided. The rotor blade includes a platform and an airfoil extending radially from a root proximate the platform to a tip. The airfoil includes a leading edge and a trailing edge. The airfoil further includes a pressure side surface extending between the leading edge and the trailing edge. The airfoil also includes a suction side surface disposed opposite the pressure side surface and extending between the leading edge and the trailing edge. The leading edge, the trailing edge, the pressure side surface, and the suction side surface collectively define a first profile at the tip and a second profile radially inward from the tip. The first profile includes a suction side overhang, a pressure side overhang, and a pressure side underhang relative to the second profile.

In accordance with another embodiment, a turbomachine is provided. The turbomachine includes a compressor section, a combustor section, and a turbine section. A plurality of rotor blades is provided in the turbine section, in which each of the plurality of rotor blades includes a platform and an airfoil extending radially from a root proximate the platform to a tip. The airfoil includes a leading edge and a trailing edge. The airfoil further includes a pressure side surface extending between the leading edge and the trailing edge. The airfoil also includes a suction side surface disposed opposite the pressure side surface and extending between the leading edge and the trailing edge. The leading edge, the trailing edge, the pressure side surface, and the suction side surface collectively define a first profile at the tip and a second profile radially inward from the tip. The first profile includes a suction side overhang, a pressure side overhang, and a pressure side underhang relative to the second profile.

These and other features, aspects and advantages of the present rotor blades and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor blades and turbomachines, including the best mode of making and using the present systems and methods, directed to one of ordinary skill in the art, is set forth in the specification, which makes reference to the appended figures, in which.

DETAILED DESCRIPTION

Figure 1:
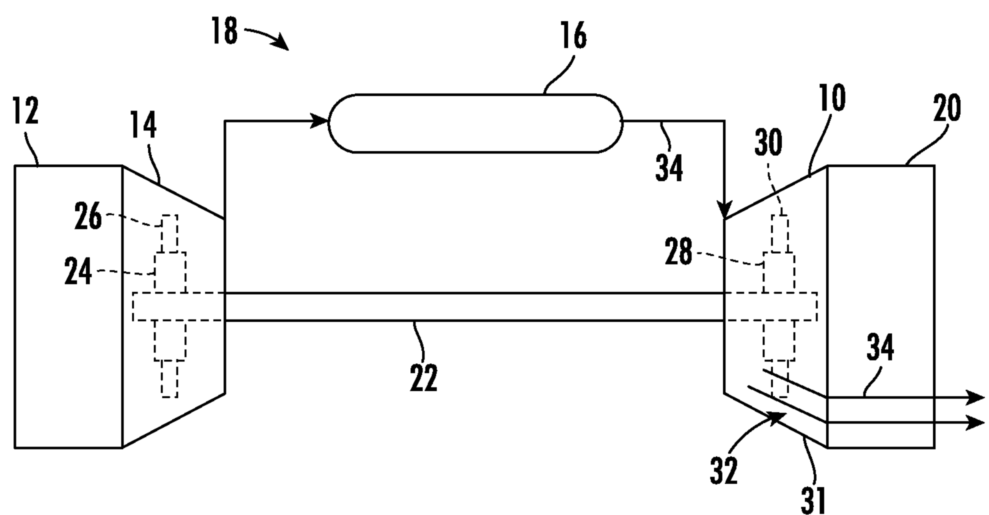
FIG. 1 is a schematic illustration of a turbomachine, in accordance with embodiments of the present disclosure.

Reference now will be made in detail to embodiments of the present rotor blades and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

It is sometimes necessary to describe parts or features that are disposed at differing radial positions with regard to a center axis. The term "radially" refers to the relative direction (i.e., movement or position) that is substantially perpendicular to an axial centerline of a particular component; the term "axially" refers to the relative direction (i.e., movement or position) that is substantially parallel and/or coaxially aligned to an axial centerline of a particular component; and the term "circumferentially" refers to the relative direction (i.e., movement or position) that extends around the axial centerline of a particular component.

Unless stated otherwise, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction. e.g., clockwise or counter-clockwise.

Referring now to the drawings, FIG. 1 provides a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine, unless otherwise specified in the claims. For example, the rotor blades as described herein may be used in any type of turbomachine including but not limited to a steam turbine, an aircraft gas turbine, or a marine gas turbine.

As shown, the gas turbine 10 generally includes an inlet section 12, a compressor section 14 disposed downstream of the inlet section 12, one or more combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds a portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within one or more combustors to produce combustion gases 34. The combustion gases 34 flow through the hot gas path 32 from the combustor section 16 into the turbine section 18, where energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
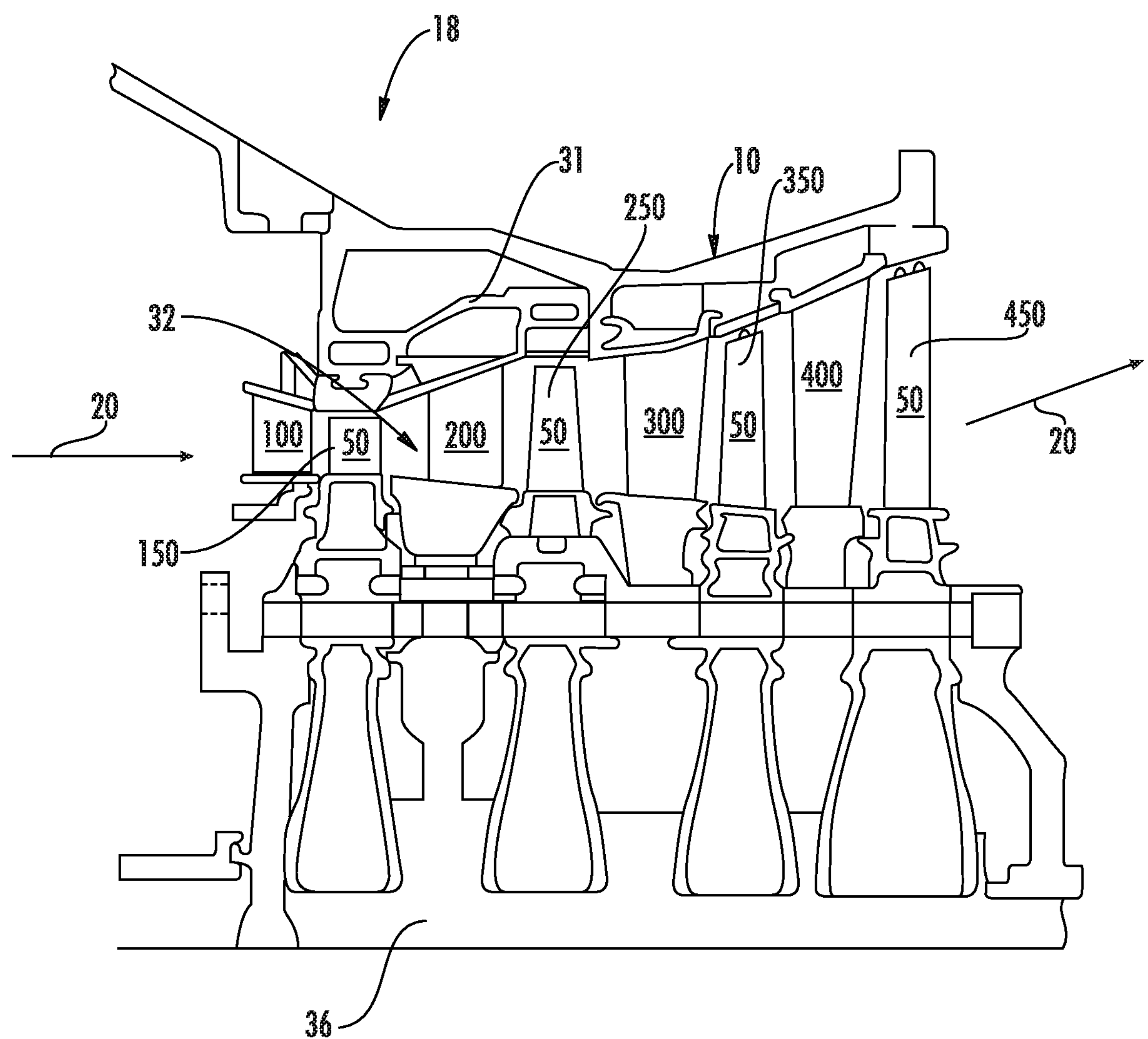
FIG. 2 illustrates a turbine section of a turbomachine, in accordance with embodiments of the present disclosure.

FIG. 2 illustrates an exemplary turbine section 18 of the gas turbine 10 including a plurality of turbine stages arranged in serial flow order. Each stage of the turbine includes a row of stationary turbine nozzles or vanes (e.g., nozzles 100) disposed axially adjacent to a corresponding rotating row of turbine rotor blades (e.g., blades 50). Four turbine stages are illustrated in FIG. 1. The exact number of stages of the turbine section 18 may be more or less than the four stages illustrated in FIG. 2. The four stages are merely exemplary of one turbine design and are not intended to limit the presently claimed turbine rotor blade in any manner.

The first stage comprises a plurality of turbine nozzles or vanes 100 and a plurality of turbine rotor blades 150. The turbine nozzles 100 are mounted to the outer casing 31 and are annularly arranged about an axis of a turbine shaft 22. The turbine rotor blades 150 are annularly arranged about and coupled to the turbine rotor 36. A second stage of the turbine section 18 includes a plurality of turbine nozzles 200 annularly arranged about the axis of the turbine rotor 36 and a plurality of turbine rotor blades 250 annularly arranged about and coupled to the turbine rotor 36. The turbine nozzles 200 may be coupled to the outer casing 31 of the turbine section 18.

As shown in FIG. 2, a third stage of the turbine section 18 includes a plurality of turbine nozzles 300 annularly arranged about the axis of the turbine rotor 36 and a plurality of turbine rotor blades 350 annularly arranged about and coupled to the turbine rotor 36. The turbine nozzles 300 may be coupled to the outer casing 31 of the turbine section 18. In particular embodiments, the turbine section 18 includes a fourth stage which includes a plurality of turbine nozzles 400 annularly arranged about the axis of the turbine rotor 36 and a plurality of turbine rotor blades 450 annularly arranged about and coupled to the turbine rotor 14. The fourth stage turbine nozzles 400 may be coupled to the outer casing 31 of the turbine section 18.

It will be appreciated that the turbine nozzles 100, 200, 300 and 400 and turbine rotor blades 150, 250, 350 and 450 are disposed or at least partially disposed within the hot gas path 32 of the turbine section 18. The various stages of the turbine 10 at least partially define the hot gas path 32 through which combustion gases, as indicated by arrows 20, flow during operation of the gas turbine 10.

Figure 3:
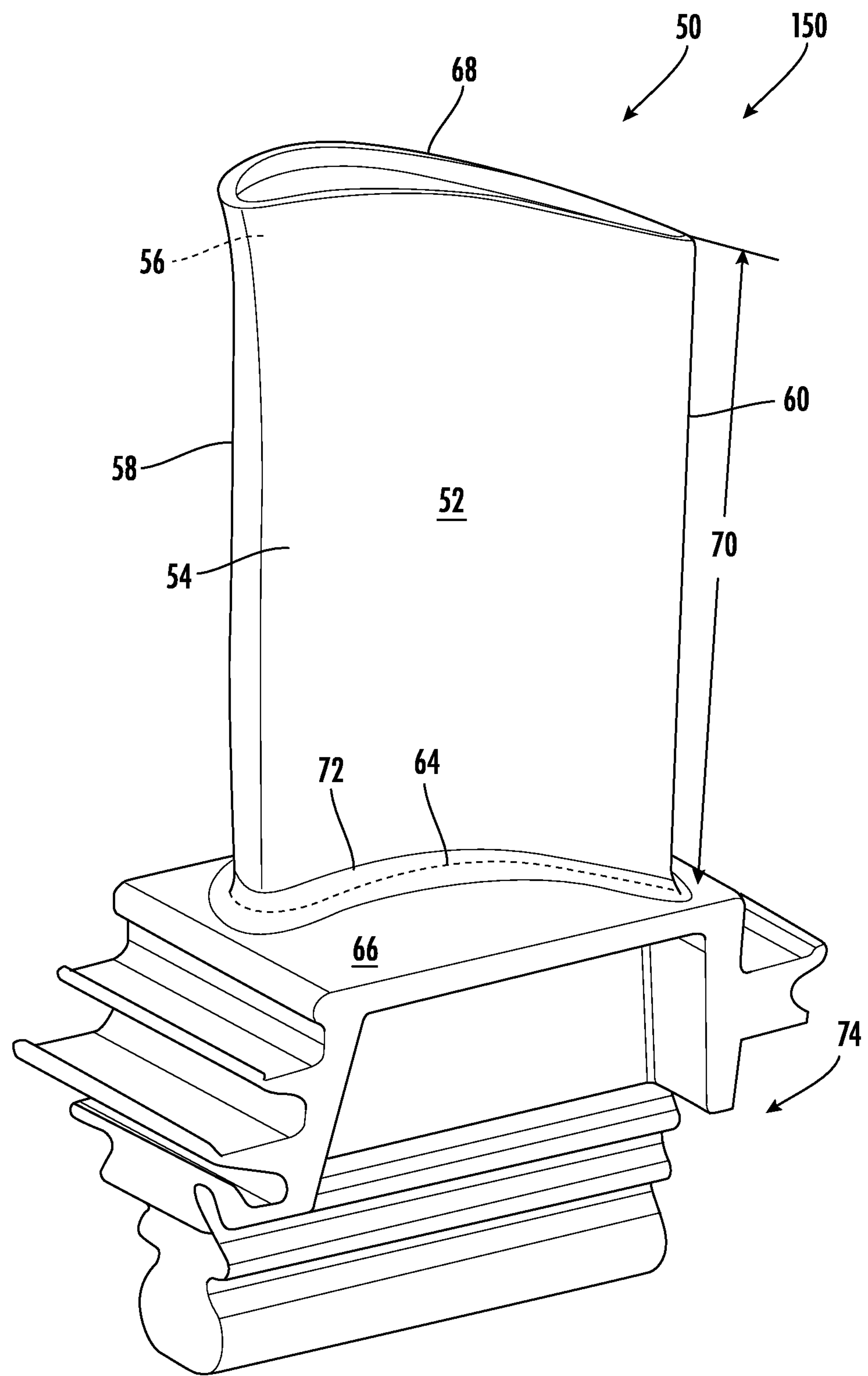
FIG. 3 illustrates a rotor blade, in accordance with embodiments of the present disclosure.

FIG. 3 provides a perspective view of an exemplary turbine rotor blade 50 as may be incorporated in any stage of the turbine section 18. As shown in FIG. 3, the turbine rotor blade 50 includes an airfoil 52 having a pressure side surface 54 and an opposing suction side surface 56. The pressure side surface 54 and the suction side surface 56 meet or intersect at a leading edge 58 and a trailing edge 60 of the airfoil 52. The leading edge 58 and the trailing edge 60 may be spaced apart from one another and define the terminal ends of the airfoil 52 in the axial direction A. A straight chord line (not shown) extends between the leading edge 58 and the trailing edge 60 such that pressure and suction side surfaces 54, 56 extend in chord or chordwise between the leading edge 58 and the trailing edge 60.

The pressure side surface 54 generally comprises an aerodynamic, concave external surface of the airfoil 52. Similarly, the suction side surface 56 may generally define an aerodynamic, convex external surface of the airfoil 52. The leading edge 58 of airfoil 52 may be the first portion of the airfoil 52 to engage, i.e., be exposed to, the combustion gases along the hot gas path 32. The combustion gases may be guided along the aerodynamic contour of airfoil 52, i.e., along the suction side surface 56 and pressure side surface 54, before being exhausted at the trailing edge 60.

As shown in FIG. 3, the airfoil 52 includes a root or first end 64, which intersects with and extends radially outwardly from a platform 66 of the turbine rotor blade 50. The airfoil 52 terminates radially at a second end or tip 68 of the airfoil 52. The root 64 of the airfoil 52 may be defined at an intersection between the airfoil 52 and the platform 66. The tip 68 is disposed radially opposite the root 64. As such, the tip 68 may generally define the radially outermost portion of the rotor blade 50 and, thus, may be configured to be positioned adjacent to a stationary shroud or seal (not shown) of the turbine section 18.

The pressure and suction side surfaces 54, 56 extend in span and define a span length 70 of the airfoil 52 between the root 64 and/or the platform 66 and the tip 68 of the airfoil 52. In other words, each turbine rotor blade 50 includes an airfoil 52 having opposing pressure and suction side surfaces 54, 56 that extend in chord or chordwise between opposing leading and trailing edges 58, 60 and that extend in span or span-wise 70 between the root 64 and the tip 68 of the airfoil 52.

In particular configurations, the airfoil 52 may include a fillet 72 formed between the platform 66 and the airfoil 52 proximate to the root 64. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 66, the airfoil 52 and the fillet 72 can be formed as a single component, such as by casting and/or machining and/or 3D printing and/or any other suitable technique now known or later developed and/or discovered. In particular configurations, the turbine rotor blade 50 includes a mounting portion 74 (such as a dovetail joint), which is formed to connect and/or to secure the turbine rotor blade 50 to the shaft 22.

At any cross-section taken between the platform 66 or the root 64 and the tip 68, the airfoil 52 of the turbine rotor blade 50 has a profile, which is collectively defined by the leading edge 58, the trailing edge 60, the pressure side surface 54, and the suction side surface 56. The profiles (i.e., cross-sectional shapes) may vary over the span of the airfoil 52, e.g., as shown in the cross-sections of FIG. 4.

The span length 70 may be measured from the root 64 to the tip 68 of the airfoil 52. A percentage of the span length 70 may be used to indicate the position of a given profile along the span length 70. For example, a profile located at "0% span" may refer to a profile of the airfoil 52 taken at the root 64. Similarly, a profile located at "100% span" may be used to refer to a profile taken at the tip 68.

Figure 4:
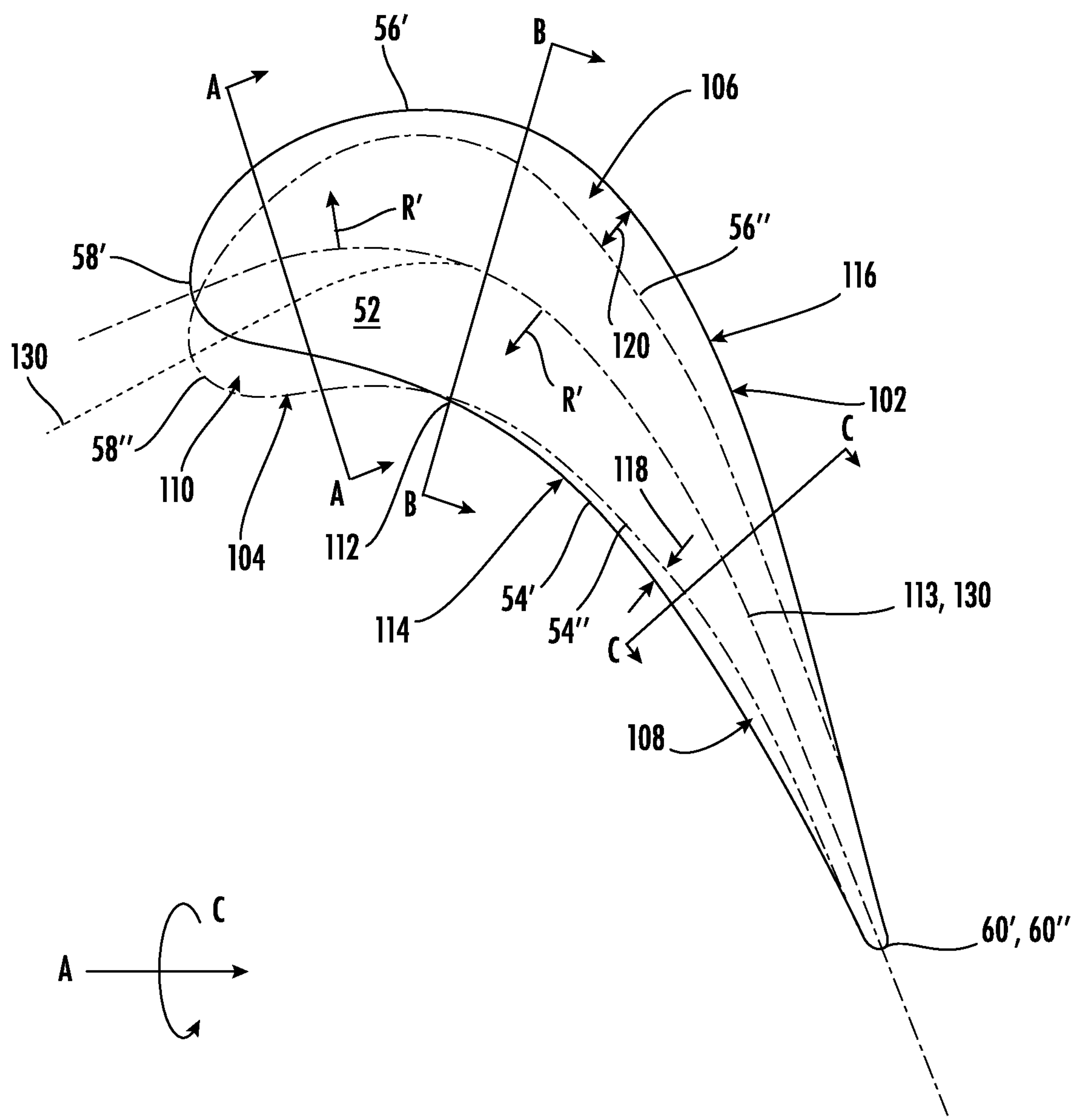
FIG. 4 illustrates two radial cross-sectional profiles of a rotor blade airfoil, in accordance with embodiments of the present disclosure.

For example, as shown in FIG. 4, the airfoil 52 may include a first profile 102 at the tip 68, i.e. the first profile 52 is taken at 100% of the span length 70 of the airfoil 52, and a second profile 104 radially inward the tip 68 and the first profile 102 with respect to a radial direction R of the gas turbine 10. In FIG. 4, the first profile 102 is illustrated as a solid line, and the second profile 104 is shown as a dotted line.

As shown in FIG. 4, the portions of the pressure side surface 54, the suction side surface 56, the leading edge 58, and the trailing edge 60 associated with the first profile 102 are shown as prime numbers, e.g., pressure side surface 54', suction side surface 56', leading edge 58', and trailing edge 60'. Similarly, the portions of the pressure side surface 54, the suction side surface 56, the leading edge 58, and the trailing edge 60 associated with the second profile 104 are shown as double prime numbers, e.g., pressure side surface 54", suction side surface 56", leading edge 58", and trailing edge 60". However, it is understood that the pressure side surfaces 54', 54" and suction side surfaces 56', 56" are portions of the same continuous pressure side surface 54 and suction side surface 56, respectively, which are positioned at different locations along the span length 70.

In various embodiments, the second profile 104 may be taken between about 90% and about 99% of the span length 70 of the airfoil 52. In other embodiments, the second profile 104 may be taken between about 92% and about 97% of the span length 70 of the airfoil 52. In particular embodiments, the second profile 104 may be taken at about 95% of the span length 70 of the airfoil 52.

In many embodiments, the first profile 102 may include a camber axis 113 that is defined halfway between the pressure side surface 54' and the suction side surface 56' of the first profile 102. As shown in FIG. 4, the camber axis 113 may be generally arcuate and include a contour substantially similar to the pressure side surface 54' and/or the suction side surface 56' of the first profile 102. Similarly, the second profile 104 may include a camber axis 130 that is defined halfway between the pressure side surface 54" and the suction side surface 56" of the second profile 104. As shown in FIG. 4, the camber axis 130 may be generally arcuate and include a contour substantially similar to the pressure side surface 54" and/or the suction side surface 56" of the second profile 104. In some areas (such as near the trailing edge 60', 60"), the camber axes 113, 130 may be coincident.

A radial direction R' may be defined orthogonally with respect to the camber axis 113. As used herein, the term "radially" may refer to the radial direction R' that is substantially perpendicular to the camber axis 113. More specifically, the radial direction R' shown in FIG. 4 extends outwards from and perpendicular to a line that is tangent to the camber axis 113 at each location along the camber axis 113 of the first profile 102.

As shown in FIG. 4, the first profile 102 of the airfoil 52 includes a suction side overhang 106, a pressure side overhang 108, and a pressure side underhang 110 relative to the second profile 104. As used herein, "overhang" is used to refer to a displacement, offset, and/or distance between two different profiles taken at the same location along the two profiles, in which the first profile is positioned radially outward from the second profile at the specified location with respect to the radial direction R'. Conversely, the term "underhang" is used to refer to a displacement, offset, and/or distance between two different profiles taken at the same location along the two profiles, in which the first profile is positioned radially inward from the second profile at the specified location with respect to the radial direction R'.

For example, as shown in FIG. 4, the suction side overhang 106 is a portion of the suction side surface 56' of the first profile 102 that is positioned radially outward from the suction side surface 56" of the second profile 104 with respect to the radial direction R'. Similarly, the pressure side overhang 108 is the portion of the pressure side surface 54' of the first profile 102 that is positioned radially outward from the pressure side surface 54" of the second profile 104 with respect to the radial direction R'. The pressure side underhang 110 is the portion of the pressure side surface 54' of the first profile 102 that is positioned radially inward from the pressure side surface 54" of the second profile 104 with respect to the radial direction R'.

In many embodiments, the first profile 102 may include a pressure side arc length 114 and a suction side arc length 116. The pressure side arc length 114 may be measured from the leading edge 58' along the pressure side surface 54' to the trailing edge 60'. Similarly, the suction side arc length 116 may be measured from the leading edge 58' along the suction side surface 56' to the trailing edge 60'. A percentage of the pressure side arc length 114 or the suction side arc length 116 may be used to indicate the position of a given feature along the arc length 114, 116. For example, a feature located at "25% arc length" may refer to a feature located one quarter of the length of the respective arc length 114 or 116, as measured from the leading edge 58' to the trailing edge 60'. Similarly, a profile located at "75% arc length" may refer to a feature located three-quarters of the length of the respective arc length 114 or 116, again as measured from the leading edge 58' to the trailing edge 60'.

As shown, the suction side overhang 106 may be defined along the entire suction side arc length 116. Further, in the illustrated embodiment, the pressure side underhang 110 and the pressure side overhang 108 each be defined along separate portions of the pressure side arc length 114. The pressure side surface 54' of the first profile 102 transitions from a pressure side underhang 110 to a pressure side overhang 108 at a transition point 112 downstream from the leading edge 58'. In various embodiments, the transition point 112 may be located between about 15% and about 35% of the pressure side arc length 114. In other embodiments, the transition point 112 may be located between about 20% and about 32% of the pressure side arc length 114. In particular embodiments, the transition point 112 may be located at about 28% of the pressure side arc length 114.

The first profile 102 of the airfoil 52 may further include a maximum pressure side overhang 118 relative to the second profile 104. In some embodiments, the maximum pressure side overhang 118 of the first profile 102 may be located between about 40% and about 70% of the pressure side arc length 114. In other embodiments, the maximum pressure side overhang 118 of the first profile 102 may be located between about 45% and about 65% of the pressure side arc length 114. In various embodiments, the maximum pressure side overhang 118 of the first profile 102 may be located between about 50% and about 60% of the pressure side arc length 114. In particular embodiments, the maximum pressure side overhang 118 of the first profile 102 may be located at about 55% of the pressure side arc length 114.

Likewise, in some embodiments, the first profile 102 of the airfoil may include a maximum suction side overhang 120. The maximum suction side overhang 120 of the first profile 102 may be located between about 30% and about 60% of the suction side arc length 116. In other embodiments, the maximum suction side overhang 120 of the first profile 102 may be located between about 35% and about 55% of the suction side arc length 116. In various embodiments, the maximum suction side overhang 120 of the first profile 102 may be located between about 40% and about 50% of the suction side arc length 116. In particular embodiments, the maximum suction side overhang 120 of the first profile 102 may be located at about 45% of the suction side arc length 116.

Figure 5:
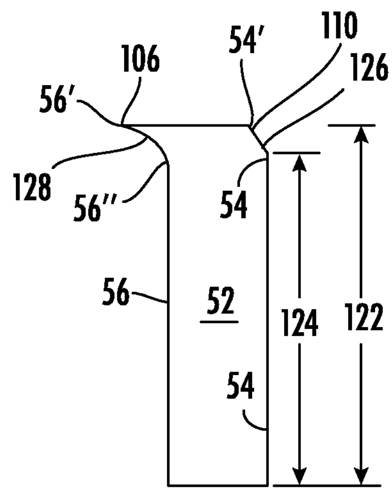
FIG. 5 illustrates a cross-sectional view of a rotor blade airfoil along line A-A of FIG. 4, in accordance with embodiments of the present disclosure.
Figure 6:
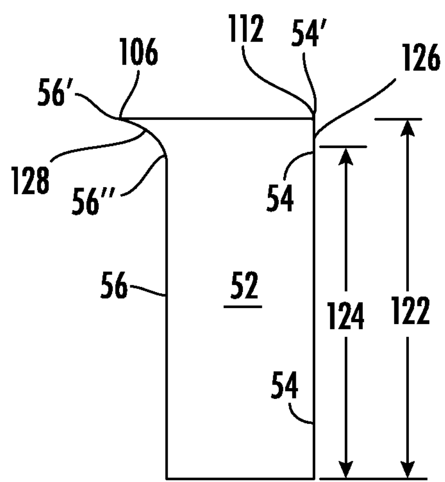
FIG. 6 illustrates a cross-sectional view of a rotor blade airfoil along line B-B of FIG. 4, in accordance with embodiments of the present disclosure.
Figure 7:
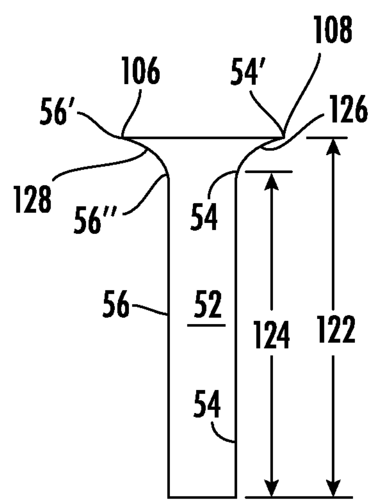
FIG. 7 illustrates a cross-sectional view of a rotor blade airfoil along line C-C of FIG. 4, in accordance with embodiments of the present disclosure.

FIGS. 5, 6, and 7 illustrate different cross-sectional views of the airfoil 52 taken at different locations along camber axis 113, e.g., at the cross-sections A-A, B-B, and C-C, respectively, of FIG. 4. As shown in FIGS. 5 through 7, the airfoil 52 may further include a first span length 122 and a second span length 124. As described herein, the first span length 122 may be the length at which the first profile 102 is defined. Similarly, the second span length 124 may be the length at which the second profile 104 is defined. Further, as shown, the airfoil may include a pressure side fillet 126 and a suction side fillet 128.

The pressure side fillet 126 may define a portion of the pressure side 54 that is radially between the second span length 124 and the first span length 122. i.e., between the second profile 104 and the first profile 102. As shown FIGS. 5 through 7, the pressure side fillet 126 may be one continuous surface that at least partially defines the pressure side underhang 110, the transition point 112, and the pressure side overhang 108. Similarly, the suction side fillet 128 may define a portion of the suction side side 56 that is radially between the second span length 124 and the first span length 122, i.e., between the second profile 104 and the first profile 102. As shown FIGS. 5 through 7, the suction side fillet 128 may be one continuous surface that at least partially defines the suction side overhang 106.

The pressure side fillet 126 and the suction side fillet 128 function to reduce the overall leakage of combustion gases across the tip 68 of the airfoil 52. Specifically, the pressure side underhang 110, the pressure side overhang 108, and the suction side overhang 106 together function to increase the overall aerodynamic efficiency of the airfoil 52. For example, the tip combined overhang and underhang described herein can reduce tip vortex formation and tip leakage, thereby inhibiting formation of a pressure gradient across a tip of the airfoil and assisting with improvement of aerodynamic performance.

The airfoil 52 described herein thus improves overall gas turbine efficiency. Specifically, the airfoil 52 provides a desired turbine efficiency lapse rate (ISO, hot, cold, part load, etc.). The airfoil 52 also meets all aeromechanical and stress requirements. The turbine rotor blade 50 described herein has very specific aerodynamic design requirements, such as an upstream bucket radial back pressure (i.e., work splits) and radial velocity triangles for the downstream turbine rotors 150, 250, 350 and 450. Significant cross-functional design effort was required to meet these design goals. The airfoil 52 of the turbine rotor blade 50 thus is of a specific shape to meet aerodynamic, mechanical, and heat transfer requirements in an efficient and cost-effective manner.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims or if they include equivalent structural elements with insubstantial differences from the literal language of the claims.

What is claimed is:

1. A rotor blade for a turbomachine, the rotor blade comprising:
- a platform;
- an airfoil extending radially from a root proximate the platform to a tip, the airfoil comprising:
  - a leading edge;
  - a trailing edge;
  - a pressure side surface extending between the leading edge and the trailing edge;
  - a suction side surface disposed opposite the pressure side surface and extending between the leading edge and the trailing edge;
  - wherein the leading edge, the trailing edge, the pressure side surface, and the suction side surface collectively define a first profile at the tip and a second profile radially inward from the tip;
  - wherein the first profile includes a suction side overhang, a pressure side overhang, and a pressure side underhang relative to the second profile.

2. The rotor blade as in claim 1, wherein the airfoil defines a radial span length between the root and the tip, and wherein the second profile is defined between about 90% and about 99% of the radial span length.

3. The rotor blade as in claim 1, wherein the pressure side underhang is defined between the leading edge and the pressure side overhang.

4. The rotor blade as in claim 1, wherein the pressure side overhang is defined between the pressure side underhang and the trailing edge.

5. The rotor blade as in claim 1, wherein the first profile includes a pressure side arc length and a suction side arc length, the pressure side arc length measured from the leading edge along the pressure side surface to the trailing edge, the suction side arc length measured from the leading edge along the suction side surface to the trailing edge.

6. The rotor blade as in claim 5, wherein the suction side overhang is defined along the entirety of the suction side arc length.

7. The rotor blade as in claim 5, wherein the pressure side underhang transitions to the pressure side overhang at a transition point located between about 15% and about 35% of the pressure side arc length measured from the leading edge to the trailing edge.

8. The rotor blade as in claim 5, wherein the first profile includes a maximum suction side overhang relative the second profile at between about 30% and about 60% of the suction side arc length.

9. The rotor blade as in claim 5, wherein the first profile includes a maximum pressure side overhang relative the second profile between about 40% and about 70% of the pressure side arc length.

10. A turbomachine, comprising:
- a compressor section;
- a combustor section downstream from the compressor section;
- a turbine section downstream from the combustor section;
- a plurality of rotor blades provided in the turbine section, each of the plurality of rotor blades comprising:
  - a platform;
  - an airfoil extending radially from a root proximate the platform to a tip, the airfoil comprising:
    - a leading edge;
    - a trailing edge;
    - a pressure side surface extending between the leading edge and the trailing edge:
    - a suction side surface disposed opposite the pressure side surface and extending between the leading edge and the trailing edge;
    - wherein the leading edge, the trailing edge, the pressure side surface, and the suction side surface collectively define a first profile at the tip and a second profile radially inward from the first profile; and
    - wherein the first profile includes a suction side overhang, a pressure side overhang, and a pressure side underhang relative to the second profile.

11. The turbomachine as in claim 10, wherein the airfoil defines a radial span length between the root and the tip, and wherein the second profile is defined between about 90% and about 99% of the radial span length.

12. The turbomachine as in claim 10, wherein the pressure side underhang is defined between the leading edge and the pressure side overhang.

13. The turbomachine as in claim 10, wherein the pressure side overhang is defined between the pressure side underhang and the trailing edge.

14. The turbomachine as in claim 10, wherein the first profile includes a pressure side arc length and a suction side arc length, the pressure side arc length measured from the leading edge along the pressure side surface to the trailing edge, the suction side arc length measured from the leading edge along the suction side surface to the trailing edge.

15. The turbomachine as in claim 14, wherein the suction side overhang is defined along the entirety of the suction side arc length.

16. The turbomachine as in claim 14, wherein the pressure side underhang transitions to the pressure side overhang at a transition point located between about 15% and about 35% of the pressure side arc length measured from the leading edge to the trailing edge.

17. The turbomachine as in claim 14, wherein the first profile includes a maximum suction side overhang relative the second profile at between about 30% and about 60% of the suction side arc length.

18. The turbomachine as in claim 14, wherein the first profile includes a maximum pressure side overhang relative the second profile between about 40% and about 70% of the pressure side arc length.

* * * * *